United States Patent [19]

Gough et al.

[11] 4,021,407

[45] May 3, 1977

[54] SYNERGISTIC ORGANOTIN BORATE STABILIZER COMPOSITIONS AND RESINS CONTAINING SAME

[75] Inventors: Robert George Gough, Fairfield; Francis Joseph Buescher, Cincinnati, both of Ohio

[73] Assignee: Cincinnati Milacron, Inc., Cincinnati, Ohio

[22] Filed: June 28, 1976

[21] Appl. No.: 700,572

[52] U.S. Cl. .................... 260/45.75 J; 252/406; 260/45.7 S; 260/45.85 H; 260/45.85 S; 260/429.7
[51] Int. Cl.² .................................... C08K 5/57
[58] Field of Search ............... 260/45.75 J, 429.7, 260/45.7 S, 45.85 H, 45.85 S; 252/406

[56] References Cited

UNITED STATES PATENTS

| | | | |
|---|---|---|---|
| 2,867,641 | 1/1959 | Ramsden | 260/429.7 |
| 3,312,725 | 4/1967 | Weissenberger | 260/429.7 |
| 3,899,465 | 8/1975 | Stapfer | 260/45.75 T |
| 3,928,285 | 12/1975 | Gough et al. | 260/45.75 K |

OTHER PUBLICATIONS

J. Orgaometal Chem. 1 (1963), 81 to 88.

*Primary Examiner*—V. P. Hoke
*Attorney, Agent, or Firm*—Donald Dunn

[57] ABSTRACT

A synergistic stabilizer composition comprising an organotin borate and an organic thiol is provided. Polyvinyl chloride resin containing the synergistic stabilizer composition exhibits improved resistance to early discoloration during processing.

23 Claims, No Drawings

SYNERGISTIC ORGANOTIN BORATE STABILIZER COMPOSITIONS AND RESINS CONTAINING SAME

BACKGROUND

This invention relates to novel synergistic stabilizer compositions comprising an organotin halide borate and an organic thiol compound. Additionally, this invention relates to methods for improving the resistance to early color formation during processing of vinyl halide homopolymers copolymers and mixtures of polymers containing vinyl halide homopolymers or copolymers. Further, this invention relates to plastic compositions comprising (1) vinyl halide homopolymers or copolymers or mixture of polymers containing vinyl halide homopolymer or copolymer, and (2) a synergistic stabilizer composition comprising an organotin halide borate and an organic thiol.

It is well known in the plastic art to process organic polymeric materials, particularly thermoplastic materials, at elevated temperatures into intermediate and finished products of commerce. Such processes as injection molding, extrusion, roll milling and blowing are conventionally employed to produce useful thermoplastic products such as pipes, bottles, baskets, etc. Vinyl halide polymers (e.g., polyvinyl chloride), copolymers and mixtures of polymers which contain vinyl halide polymers or copolymers are conveniently processed by these well known art methods. However, during the elevated temperature processing of plastics, particularly the thermoplastics, more particularly the vinyl halide homopolymers, vinyl halide copolymers and mixtures of polymers which contain vinyl halide homopolymers or vinyl halide copolymers degradation of the plastic often occurs. This degradation is manifested by undesirable changes in physical properties, changes in processing behavior and often a development or change of color and is particularly noticeable in unstabilized plastics (i.e., plastics which do not contain stabilizers). Degradation or discoloration during processing is particularly undesirable in clear or lightly colored plastics. Therefore, it is desirable to prevent or inhibit such undesirable changes and the discoloration of plastics druing processing so as to achieve useful products free of discoloration.

To inhibit or prevent discoloration of vinyl halide homopolymers, vinyl halide copolymers and mixtures of polymers containing vinyl halide homopolymers or vinyl halide copolymers it has been known in the art to incorporate therein such materials as organic thiols, hindered phenols, tin carboxylates, organotin carboxylates, and organotin mercaptides. Synergistic combinations such as a combination of an organic thioanhydride and a monohydrocarbyl tin compound having the formula $R^3Sn(Z)_n(Z'R^4)_{3-2n}$ where $R^3$ is a 1 to 12 carbon atom hydrocarbyl radical, Z and Z' are either oxygen or sulfur, $R^4$ is hydrogen or an organic radical bonded to Z' by a carbon atom and n is 0-1.5 as disclosed in U.S. Pat. No. 3,822,233, have also been reported for improving the resistance of halogen containing resin to early color development during processing. Organotin compounds of the general formula $(R_2Sn)_{3-n}(R^1)_{2n}(BO_3)_2$ where R and $R^1$ are univalent organic radicals selected from the class consisting of alkyl, aryl, and aralkyl radicals and n is 0, 1 or 2 are disclosed as stabilizers for chlorine containing polymers (e.g. polyvinyl chloride) by H. E. Ramsden in U.S. Pat. No. 2,867,641. Ramsden described these compounds as organotin borates or their partially esterified products. It is pointed out by the inventors that the compounds disclosed by Ramsden are particularly free of

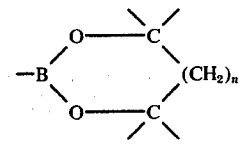

(1)

cyclic structures where n is 0 or 1, (2) tin-oxygen-tin bonding and (3) tin-halogen bonding of the organotin compounds of the stabilizer compositions of this invention. Many of these materials which have been used or suggested to be used to improve the resistance of halogen containing resins to early color development during processing have not been entirely satisfactory, or are expensive or are difficult to make, or have undesirable properties such as being ordoriferous during processing of the plastic or in themselves impart some initial color to the plastic. The combination of an organotin borate with an organic thiol as a stabilizer composition has been disclosed in U.S. Pat. No. 3,928,285 issued Dec. 23, 1975 to the same inventors as in this invention. However, the organotin borates of the stabilizer compositions of U.S. Pat. No. 3,928,285 do not contain the tin-halogen bond of the organotin borates of this invention. That organotin borates having a tin-halogen bond form in synergistic combination with an organic thiol stabilizer compositions to stabilize vinyl halide homopolymer or copolymers or polymer mixtures containing vinyl halide hompolymers or copolymers is only taught to the art by this invention.

Organotin borate compounds heretofore known in the art for use in stabilizing polymers are in many instances known to exhibit significant hydrolytic instability. However, in contrast of many of the prior art organotin borate stabilizers the organotin halide borate compounds of the stabilizer compositions of this invention exhibit good resistance to hydrolysis.

It is, therefore, an object of this invention to provide a synergistic stabilizer composition comprising an organotin halide borate and an organic thiol compound for improving the resistance of halogen containing polymers to early color development during processing at elevated temperatures. A further object of this invention is to provide a plastic composition exhibiting improved resistance to early color development during elevated temperature processing. A still further object of this invention is to provide a method for improving the resistance to early color formation of halogen containing polymers.

SUMMARY OF THE INVENTION

It has been discovered that the foregoing objects and others can be achieved by a novel synergistic stabilizer composition comprising (1) an organotin halide borate, and (2) an organic thiol compound having a molecular weight of from 40 to 400 per thiol group and a boiling point of at least 180° C at one atmosphere pressure, the organotin halide borate being a member selected from organotin halide borates having the following general formula:

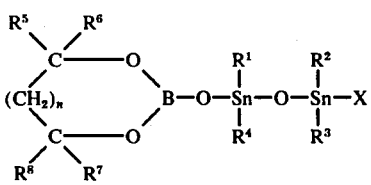

where $R^1$, $R^2$, $R^3$ and $R^4$ are the same or different and are an aryl group, aralkyl group, alkaryl group or $C_1$ to $C_8$ alkyl group, $R^5$ and $R^7$ are hydrogen or $C_1$ to $C_4$ alkyl groups, $R^6$ and $R^8$ are $C_1$ to $C_4$ alkyl groups, X is halogen of atomic weight of 35 to 80, and $n$ is 0, 1 or 2. Further, what has been discovered is novel plastic compositions having improved resistance to early color formation during processing comprising a vinyl halide homopolymer, vinyl halide copolymer or polymer mixtures containing vinyl halide homopolymer or copolymer and the foregoing synergistic stabilizer composition comprising an organotin halide borate and an organic thiol compound as specified herein.

The synergistic stabilizer compositions of this invention are especially suitable for stabilizing halogen containing homopolymer, or copolymers and polymer blends containing halogen containing homopolymers or copolymers, more particularly vinyl halide homopolymers or copolymers and polymer blends containing vinyl halide homopolymer or copolymers against early color formation during elevated temperature processing. The novel plastic compositions of this invention find utility in making articles of commerce such as pipes and bottles by such methods as injection molding, blow molding and extrusion.

DESCRIPTION OF THE INVENTION

In accordance with this invention there is provided a novel synergistic stabilizer composition comprising (1) an organotin halide borate which is a member selected fromm organotin halide borates having the following general formula:

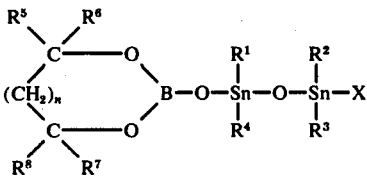

where $R^1$, $R^2$, $R^3$ and $R^4$ are the same or different and are an aryl group, aralkyl group, alkaryl group or $C_1$ to $C_8$ alkyl group, $R^5$ and $R^7$ are hydrogen or $C_1$ to $C_4$ alkyl groups, $R^6$ and $R^8$ are $C_1$ to $C^4$ alkyl groups, X is halogen of atomic weight 35 to 80 (e.g. chlorine or bromine), and $n$ is 0, 1 or 2 and (2) an organic thiol compound having a molecular weight of from 40 to 400 per thiol group, a boiling point of at least 180° C at one atmosphere pressure and being a member selected from organic thiols having the following general formulae:

$$\left( HS-R^{12}-\overset{O}{\underset{\parallel}{C}}-O \right)_u M \qquad (c)$$

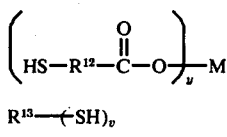

$$\left( HS-R^{12}-\overset{O}{\underset{\parallel}{C}}-O \right)_w Q-(OH)_u \qquad (e)$$

$$\left( HS-R^{12}-O-\overset{O}{\underset{\parallel}{C}} \right)_h K-\left( \overset{O}{\underset{\parallel}{C}}-OH \right)_j \qquad (f)$$

where $R^{12}$ is a $C_1$ to $C_{20}$ linear or branched alkylene radical, $R^{13}$ is an aromatic or $C_3$ to $C_{36}$ aliphatic group having a free valence equal to $v$, M is hydrogen, calcium, barium, tin, cadmium or lead, Q is saturated or unsaturated aliphatic group, cycloaliphatic group, or aromatic group, and having a free valence equal to ($w + u$), K is a saturated or unsaturated aliphatic group, cycloaliphatic group or aromatic group having a free valence equal to ($h + j$), $y$ is 1 to 4, $v$ is 1 to 6, $w$ is 1 to 8, $u$ is 0 to 7, $h$ is 1 to 4 and $j$ is 0 to 3, wherein $u + w$ is from 1 to 8 and $h + j$ is from 1 to 4. Further, in accordance with this invention there are provided plastic compositions, having improved resistance to early color formation during processing, comprising (1) a plastic which is a vinyl halide homopolymer, vinyl halide copolymer or a polymer blend containing a vinyl halide homopolymer or vinyl halide copolymer, (2) an organotin halide borate which is a member of the group of organotin halide borates having the following formula:

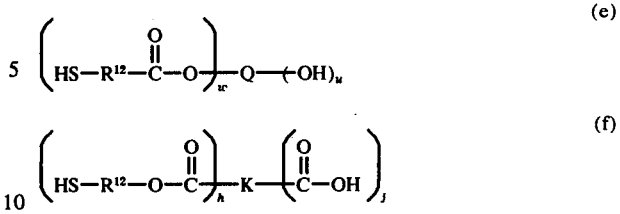

where $R^1$, $R^2$, $R^3$ and $R^4$ are the same or different and are an aryl group, aralkyl group, alkaryl group or $C_1$ to $C_8$ alkyl group, $R_5$ and $R_7$ are hydrogen or $C_1$ to $C_4$ alkyl groups, $R^6$ and $R^8$ are $C_1$ to $C_4$ alkyl groups, X is halogen of atomic weight 35 to 80 and $n$ is 0, 1 or 2 and (3) an organic thiol compound having a molecular weight of from 40 to 400 per thiol group, a boiling point of at least 180° C at one atmosphere and being a member selected from organic thiols having the following formulae:

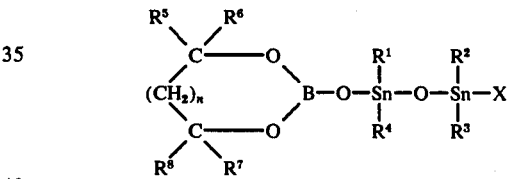

$$R^{13}-(SH)_v \qquad (d)$$

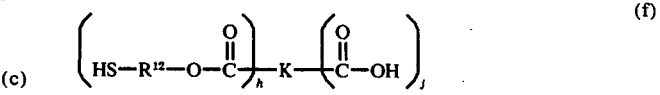

where $R^{12}$ is a $C_1$ to $C_{20}$ linear or branched alkylene radical, $R^{13}$ is an aromatic or $C_3$ to $C_{36}$ aliphatic group having a free valence equal to $v$, M is hydrogen, calcium, barium, tin, cadmium or lead, Q is a saturated or unsaturated aliphatic group, cycloaliphatic group, or aromatic group and having a free valence equal to ($w + u$), K is a saturated or unsaturated aliphatic group, cycloaliphatic group or aromatic group having a free valence equal to ($h + j$), $y$ is 1 to 4, $v$ is 1 to 6, $w$ is 1 to 8, $u$ is 0 to 7, $h$ is 1 to 4 and $j$ is 0 to 3, wherein $u + w$ is from 1 to 8 and $h + j$ is from 1 to 4.

In the practice of this invention the weight ratio of organotin halide borate to organic thiol may vary widely. It is, however, preferred to use a weight ratio of organotin halide borate to organic thiol in the range of from 1:4 to 4:1 and more preferably in the range of from 1:1 to 7:3. The combined weight concentration of organotin halide borate and organic thiol in the plastic compositions of this invention may vary widely, the principle limitation being that there be at least a stabilizingly effective total amount of the organotin halide borate and organic thiol. It is well recognized that total amounts of organotin halide borate and organic thiol substantially higher than needed to stabilize the plastic against early color formation during processing can be used in the plastic compositions of this invention, however, such concentration would not be required. Thus in the practice of the plastic compositions of this invention it is preferred to use a total weight concentration of organotin halide borate plus organic thiol compound of from 0.01 to 5 weight percent based on the weight of the plastic component itself and more preferably from 0.5 to 1.0 weight percent based on the plastic component, said plastic component being the polymer selected from the group consisting of vinyl halide homopolymer, vinyl halide copolymer and polymer blend containing a vinyl halide homopolymer or vinyl halide copolymer.

The organotin halide borates usuable in the practice of this invention are characterized by having the tin atom bonded to boron through a oxygen atom, tin bonded directly to carbon, a tin-oxygen-tin bond and a tin-halogen bond and are members of organotin halide borates having the following formula:

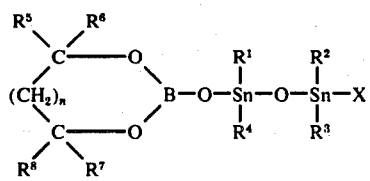

where $R^1$, $R^2$, $R^3$, $R^4$, $R^5$, $R^6$, $R^7$, $R^8$, X and $n$ are as previously defined herein.

Examples of organotin halide borates usuable in the practice of this invention include but are not limited to the following enumerated compounds.

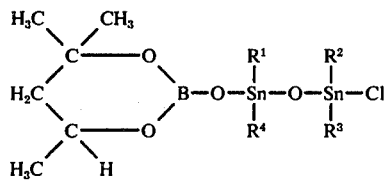

(a-1) where $R^1$, $R^2$, $R^3$, and $R^4$ and n-butyl groups, (a-2) where $R^1$, $R^2$, $R^3$ and $R^4$ are isobutyl groups, (a-3) where $R^1$, $R^2$, $R^3$, and $R^4$ are 2-ethylhexyl groups, (a-4) where $R^1$, $R^2$, $R^3$ and $R^4$ are octyl groups, (a-5) where $R^1$, $R^2$, $R^3$ and $R^4$ are propyl groups, (a-6) where $R^1$, $R^2$, $R^3$ and $R^4$ are ethyl groups, (a-7) where $R^1$, $R^2$, $R^3$ and $R^4$ are methyl groups, (a-8) where $R^1$ and $R^4$ are methyl and $R^2$ and $R^3$ are butyl groups, (a-9) where $R^1$, $R^2$, $R^3$ and $R^4$ are phenyl groups, (a-10) where $R^1$, $R^2$, $R^3$ and $R^4$ are benzyl groups, (a-11) where $R^1$, $R^2$, $R^3$ and $R^4$ are tolyl groups, and (a-12) where $R^1$ and $R^4$ are phenyl and $R^2$ and $R^3$ are benzyl groups,

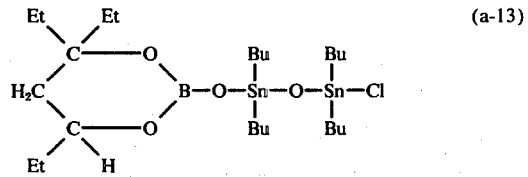

where Et = ethyl and Bu = n-butyl,

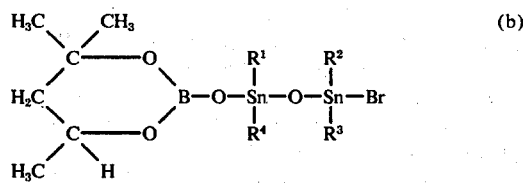

(b-1) where $R^1$, $R^2$, $R^3$ and $R^4$ are n-butyl groups, (b-2) where $R^1$, $R^2$ $R^3$ and $R^4$ are isobutyl groups, (b-3) where $R^1$, $R^2$, $R^3$ and $R^4$ are 2-ethylhexyl groups, (b-4) where $R^1$, $R^2$, $R^3$ are octyl groups, (b-5) where $R^1$, $R^2$, $R^3$ and $R^4$ are propyl groups, (b-6) where $R^1$, $R^2$, $R^3$ and $R^4$ are ethyl groups, (b-7) where $R^1$, $R^2$, $R^3$ and $R^4$ are methyl groups, (b-8) where $R^1$ and $R^4$ are methyl and $R^2$ and $R^3$ are butyl groups, (b-9) where $R^1$, $R^2$, $R^3$ and $R^4$ are phenyl groups, (b-10) where $R^1$, $R^2$, $R^3$ and $R^4$ are benzyl groups, (b-11) where $R^1$, $R^2$, $R^3$ and $R^4$ are tolyl groups, and (b-12) where $R^1$ and $R^4$ are phenyl and $R^2$ and $R^3$ are benzyl groups,

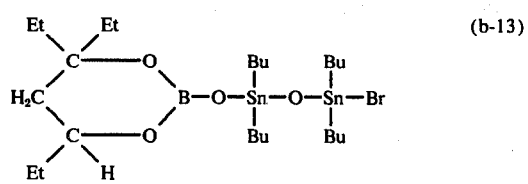

where Et = ethyl and Bu = n-butyl.

A number of methods may be used to prepare the organotin halide borates usuable in the practice of this invention. One method, for example, is to react a borate ester of a glycol with 1-halo-3-hydroxy-1, 1,3,3tetrahydrocarbyl distannoxane in a solvent forming an azeotrope with water with removal of water by azeotropic distillation. The borate esters used to prepare the organotin halide borates usable in the practice of this invention can be prepared by reacting boric acid with a glycol. Suitable glycols include 2-methyl-2, 4-pentanediol; 2, 4-dimethyl-2, 4-pentanediol; 2, 3-dimethyl-2, 3-butanediol; and 2, 5-dimethyl-2, 5-hexanediol. Typical 1-halo-3-hydroxy-1,1,3,3-tetrahydrocarbyl distannoxanes usable in the preparation of the organotin halide borates of the stabilizer compositions of this invention include but are not limited to 1-chloro-3-hydroxy-1,1, 3,3-tetramethyldistannoxane, 1-bromo-3-hydroxy-1,1,3,3-tetramethyl distannoxane, 1-chloro- 3-hydroxy-1,1,3,3 tetraethyl distannoxane, 1-bromo-3-hydroxy-1,1,3,3-tetraethyl distannoxane, 1-chloro-3-hydroxyl-1,1,3,3 tetrahexyl distannoxane, 1-bromo-3-hydroxyl- 1,1,3,3 tetra 2-ethyl hexyl distannoxane, 1chloro-3-hydroxy-1,1,3,3 tetraphenyl distannoxane, 1-chloro-3-hydroxyl-1,1,3,3-tetrabenzyl distannoxane, 1-bromo-3-hydroxyl-1,1,3,3 tetratolyl distannoxane and 1-chloro-3-hydroxy-1,1-dimethyl-3,3-dibutyl distannoxane. The preparation of a 1-hao-3-hydroxy-1,1,3,3-tetrahydrocarbbyl distannoxane is exemplified by R. Okawara and M. Wada in the Journal of Organometallic Chemistry, 1, 81–88 (1963) the entire disclosure of which is incorporated herein by reference, as to 1-chloro-3-hydroxy-1,1,3,3-tetrabutyl distannoxane.

The organic thiol compounds usable in the practice of this invention are organic thiol compounds which are substantially free of odor during elevated temperature processing of the plastic, which have free thiol (—SH) groups, a molecular weight of from 40 to 400 per thiol group in the compound and a boiling point of at least 180° C at one atmosphere pressure. By a molecular weight of not greater than 400 per thiol group what is meant is that when the molecular weight of the organic thiol compound is divided by the number of thiol group in the compound the resulting value shall be at least 40 and shall not exceed 400. Thus, for example, an organic thiol having a molecular weight of 200 and two thiol groups would have a molecular weight per thiol group of 100. Organic thiol compounds usable in the preferred practice of this invention are organic thiols, substantially free of odor during the elevated temperature processing of the plastic, having a molecular weight per thiol group of from 40 to 400, a boiling point of at least 180° C at one atmosphere and are members selected from organic thiol compounds having the following general formulae:

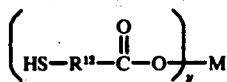 (c)

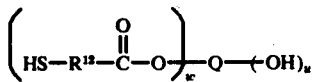 (d) (e)

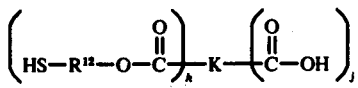 (f)

where $R^{12}$, $R^{13}$, Q, K, M, y, v, w, u, h and j are as have been previously defined herein.

Examples of organic thiol compounds usable in the practice of this invention include but are not limited to-
isooctyl thioglycolate
octyl thioglycolate
2-ethylhexyl thioglycolate
isooctyl-3-mercaptopropionate
octyl-3-mercaptopropionate
dodoecyl thiol
butyl thioglycolate
benzyl thioglycolate
octadecyl thioglycolate
1-octanethiol
toluenethiol
dodecylphenyl thiol
2-thioethyl octanoate
3-mercapto-1, 2-propane diol
dioctyl mercaptosuccinate
mercaptosuccininic acid
2, 2′-thiodiethanethiol
p-chlorobenzyl mercaptan
pentaerythritol tetra (thioglycolate)
dipentaerythritol hexa (3-mercaptopropionate)
tripentaerythritol hexa (3-mercaptopropionate)
pentaerythritol tris (thioglycolate)
pentaerythritol bis (thioglycolate)
trimethylolethane tris (3-mercaptopropionate)
trimethylolpropane bis (thioglycolate)
calcium salt of 3-mercaptoproprionic acid barium salt of mercaptoacetic acid
bis(2-mercaptoethyl) terephthalate
mono (2-mercaptoethyl) adipate The thiols usable in the practice in this invention may be prepared by any of a number of methods well-known in the chemical art as for example the reaction of an alkyl halide with sodium hydrosulfide, reaction of an olefinic unsaturated compound with hydrogen sulfide and pyrolytic cleavage of an organic sulfide. Additionally, the thiols usable in the practice of this invention are those which do not, in the stabilizer composition of this invention, promote or accelerate decomposition of the plastic.

As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl matleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutyl-methacrylate, polyvinyl chloride and polystyrene, polyvinyl chloride and acrylonitrille-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride -2 ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units.

In the novel plastic compositions of this invention there may be present, in addition to the organotin halide borate and organic thiol compound commbination of this invention, conventional additives such as fillers, pigments, plasticizers, dyes, lubricants, and ultraviolet light stabilizers well-known to the plastic art. Among the fillers, such materials as calcined clays, calcium carbonate, and talcs are used. Pigments well-known in the art can be used including such materials as titanium dioxide, carbon black and iron oxide. Included among the well-known plasticizers which are usable are phthalates, sebacates, adipates, phosphates and fatty esters having between 16 to 150 carbon atoms. Lubricants well known in the art, which may be used include hydrocarbon waxes, stearyl stearate, cetyl palmitate and other ester waxes. Stabilizers such as well-known ortho hydroxy benzophenones, hydroxy benezotriazoles organotin carboxylates, organotin sulfides, and organotin mercaptocarboxylic acid esters may be used. Antioxidants include tricresyl phosphite; 2, 6-di-t-butyl-4-methyl phenol; 2, 6-di-t-butyl-4-decyloxy phenol and 2-t-butyl-4-octadecyloxy phenol.

Methods well-known in the art for compounding plastic compositions for subsequent processing by methods such as injection molding, extrusion and the like may be used for the preparation of the plastic compositions of this invention. Such methods include dry blending with conventional mixers such as the well-known Henschel blender, blending on to a two or three roll mill and tumbling. The organotin halide borate-organic thiol compound synergistic stabilizer compositions of this invention may be prepared by blending techniques well-known in the art and include dry blending by low speed, low shear mixers, tumbling and the like. The plastic compositions of this invention may be prepared by first blending together the organotin halide borate and the organic thiol compound and subsequently adding the resultant blend to the vinyl halide homopolymer, vinyl halide copolymer or polymer blend containing a vinyl halide homopolymer or vinyl halide copolymer. Alternatively the organotin halide borate and organic thiol compound may be each separately added to the vinyl halide polymer, vinyl halide copolymer or the homopolymer containing a vinyl halide homopolymer or copolymer. The order of the separate addition of the organotin halide borate and organic thiol compound may vary, it not being critical as to which of these two materials is added first and which is added thereafter.

The following examples are presented to further describe the invention and the practice thereof and are not intended to be limitingon the invention or its practice. In the following examples all amounts, ratios and percentages are intended to be by weight and temperature in degrees Centigrade unless otherwise indicated.

EXAMPLE 1: PREPARATION OF 4,4,6-TRIMETHYL-2-HYDROXY-1,3, 2-DIOXABORINANE.

Boric acid (1mole) and 2methyl-2,4-pentanediol (1mole) were placed in a reaction vessel with 1,000 ml of benzene and the mixture refluxed until 2 moles of benzene and water were removed. Evaporation of the benzene at reduced pressure gave a liquid which slowly crystalized to give a white solid mp 73–75° C. [literature mp 69°–70° C. H. Steinberg and D. L. Hunter, Ind. & Eng. Chem. 49, 174–181 (1957)].

EXAMPLE 2: PREPARATION OF 1-(4,4,6-TRIMETHYL-1,3,2-DIOXABORINYL -2-OXY)-3-CHLORO-1,1,3,3-TETRAMETHYLDISTANNOXANE. (I)

The title compound also previously described herein as a-7, was prepared by reacting 0.0273 mole, 10.00 gms, of 1-hydroxy-3-chloro- 1,1,3,3-tetramethyl-distannoxane with 0.0273 mole, 3,93 gm, of 4,4,6- trimethyl-2-hydroxy-1,3,2-dioxaborinane. The reaction was carried out in refluxing benzene with the water by-product being removed as the azeotrope. After 1.5 hrs. refluxing, a 100% yield of water was obtained. Evaporation of the solvent gave a quantitative yield of crude product with mp 253°–255° C. Crystallizaton from acetonitrile gave a 43% yield of white crystals, mp 252°–253° C. The 1-hydroxy-3-chloro-1,1,3,3-tetramethyldistannoxane was prepared by the method of Okawara [R. Okawara and M. Wada, J. Organometal. Chem. 1, 81–88 (1963)].

Elemental analysis: found (calculated): C 24.27% (24.42%), H 4.76% (4.92% ), B 1.70% (2.20%), Sn 47.65% (48.25% ), Cl 7.12% (7.21% ).

The compound showed a mass spectrograph with a parent ion molecular weight of 492 (calculated: 492), and peak patterns at mass $185[(CH_3)_2Sn$ —CL], mass 309

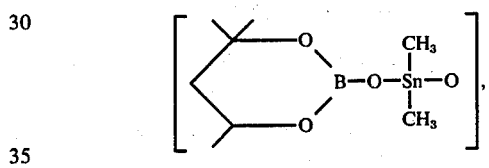

mass 165 $[(CH_3)_2SnO]$ and mass 128

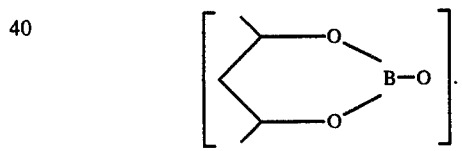

The patterns showed excellent agreement with the patterns calculated on the basis of isotope abundances of Sn, B, and Cl.

EXAMPLE 3: PREPARATION OF 1-(4,4,6-TRIMETHYL-1,1,3,2-DIOXABORINYL-2OXY) -3-CHLORO-1,1,3,3-TETRABUTYLDISTANNOXANE. (III)

The product also previously designated herein as a-1, was obtained by the reaction of 0.022 mole of 1-chloro-3-hydroxy-1,1,3,3tetrabutyldistannoxane* with 0.022 mole of 4,4,6-trimethyl-2-hydroxy- 1,3,2-dioxaborinane. The reaction was carried out in refluxing benzene with the water by-product being removed as the azeotrope. After 15.5 hours of refluxing, 75% of the theoretical amount of water had been collected. Evaporation of the benzene gave a product which crystallized to an off-white, waxy material, mp 75°–79° C. The infrared spectrum (neat, NaCl) showed bands at 3100 (w), 3080 (w), 3045 (m), 2960 (m), 2930 (m), 2870 (m), 1960 (w), 1820 (w), 1485 (m), 1465 (m), 1420 (m), 1380 (s), 1355 (s), 1300 (s), 1270 (m), 1230 (m), 1210 (m), 1170 (m), 1080 (w), 1040 (w), 870 (w), 820 (w), 770 (w), 680 (s), 580 (s) cm$^{-1}$. Presence of halogen was verified by a sodium fusion test.

(*) R. Okawara and M. Wada, J. Organometal. Chem., 1, 81–88(1963).

EXAMPLE 4: PREPARATION OF 1(4,4,6-TRIMETHYL-1,3,2-DIOXABORINYL-2-OXY)-3-BROMO-1,1,3,3-TETRABUTYL DISTANNOXANE. (III)

The product also previously designated herein as b-1, was obtained by the reaction of 0.022 mole of 1-bromo-3-hydroxy-1,1,3,3-tetrabutyldistannoxane* with 0.022 mole of 4,4,6-trimethyl-2-hydroxy- 1,3,2-dioxaborinane. A benzene solution of the reagents was refluxed until no more water was being removed as the azeotrope. Evaporation of the benzene at reduced pressure gave a product which formed waxy crystals, mp 54°–56° C, in near quantitative yield. The infrared spectrum (melt on NaCl plates) showed bands at 2970 (s), 2940 (s), 2890 (s), 2870 (s), 1466 (s), 1420 (s), 1380 (s), 1355 (s), 1300 (s), 1275 (s), 1227 (m),1210 (s), 1170 (s), 1080 (m), 875 (m), 820 (m), 770 (m), and 675 (s), cm$^{-1}$.

Elemental analysis: found (calculated): C 37.22% (37.49%), H 7.08% (6.87%), Br 11.33% (11.34%).

EXAMPLE 5: 1-(4,4,6-TRIMETHYL-1,3,2-DIOXABORINYL-2-OXY)-3-CHLORO-1,1,3,3-TETRAOCTYLDISTANNOXANE. (a-4)

1-chloro-3-hydroxy-1,1,3,3-tetraoctyldistannoxane (0.10 mole) may be allowed to react with 4,4,6-trimethyl-2-hydroxy-1,3,2-dioxaborinane in benzene at reflux until no more water is removed by azeotropic distillation. The reaction mixture may then be filtered and the benzene solution concentrated on a rotary evaporator at reduced pressure to obtain the titled product.

EXAMPLES 6–25:

In the following examples there is demonstrated the synergy and stabilizing activity of several embodiments of the stabilizer composition of this invention. The organotin halide borates and/or organic thiols shown in Tables 1 and 2 below, at the concentrations indicated therein, were added to a blend of polyvinyl chloride resin (Geon 103 EP from B. F. Goodrich Chemical Co.) 100 parts, Titanox TiO$_2$ 1.0 part, calcium stearate 1.0 part, and Cincinnati Milacron Advawax 165 (Cincinnati Milacron Chemicals Inc.) 0.7 part. The mixture was then blended for five minutes at high shear in a Ronson blender. The resulting powdered blend was then placed on a 2-roll Farrell mill having the rolls at 380° F and a differential roll speed of 30 rpm for the front roll and 40 rpm for the rear roll and at intervals of two minutes the resin color observed. Table 1 below summarizes the results obtained using the organotin halide borates of Examples 2,3 and 4 while Table 2 summarizes the results obtained using a number of different organic thiols and the organotin halide borate of Example 2.

Table 1

Heat Stabilization of PVC with Synergistic Combinations of Organotin Halide Borates with Thiols

| Experiment No. | Organotin Halide Borate* (conc) | Conc. of Thiol (isooctylthioglycolate) | Initial Color | Time to Develop Significant Color (Yellow or Tan) |
|---|---|---|---|---|
| 6 | I(0.5 phr) | 0.33 phr | wh. | 8 minutes |
| 7 | I(0 phr.) | 0.50 phr | lt. tan | 2 minutes |
| 8 | I(0.5 phr) | 0 phr | tan | 2 minutes |
| 9 | II(0.5 phr) | 0.33 phr | wh. | 8 minutes |
| 10 | II(0.5 phr) | 0 phr | lt. brown | 2 minutes |
| 11 | III(0.5 phr) | 0.33 phr | wh. | 10 minutes |
| 12 | III(0.5 phr) | 0 phr | lt. brown | 2 minutes |

*I is the organotin halide borate product of Example 2
II is the organotin halide borate product of Example 3
III is the organotin halide borate product of Example 4
phr = parts per hundred parts of resin Table 2.

Illustrating Variety of Thiol Compounds which Form Synergistic Combinations with Organotin Halide Borates

| Example | Conc. of I* (phr) | Organic Thiol | Conc. of Thiol | Initial Color | Time to Develop Signif. Color |
|---|---|---|---|---|---|
| 13 | 0.5 | none | 0 phr | brown | 2 min. |
| 14 | 0.5 | octyl mercaptan | 0.33 | white | 10 min. |
| 15 | 0.5 | dodecyl mercaptan | 0.33 | white | 10 min. |
| 16 | 0.5 | benzyl thioglycolate | 0.33 | white | 10 min. |
| 17 | 0.5 | butyl thioglycolate | 0.33 | white | 10 min. |
| 18 | 0.5 | octadecyl thioglycolate | 0.33 | white | 10 min. |
| 19 | 0.5 | isooctyl 3-mercaptopropionate | 0.33 | white | 10 min. |
| 20 | 0.5 | isooctyl thioglycolate | 0.33 | white | 8 min. |
| 21 | 0.27 | thioglycolic acid | 0.17 | white | 6 min. |
| 22 | 0.27 | calcium thioglycolate | 0.20 | white | 6 min. |
| 23 | 0.27 | 3-mercaptopropionic acid | 0.19 | white | 4 min. |
| 24 | 0.27 | pentaerythritol tetrakis (3-mercaptopropionate | 0.22 | white | 8 min. |
| 25 | 0.27 | dodecyl mercaptan | 0.36 | white | 8 min. |

*I is the organotin halide borate product of Example 2
phr = parts per hundred parts of resin While the invention and the practice thereof has been described with respect to various embodiments, it is recognized that one skilled in the art may practice further embodiments of the invention without departing from the spirit and scope of the invention set forth and claimed herein.

What is claimed is:
1. A stabilizer composition for stabilizing vinyl halide homoploymers, vinyl halide copolymers and polymer blends containing vinyl halide homopolymers or vinyl halide copolymers against early color formation during processing comprising a synergistic combination of (1) an organotin halide borate which is a member selected from organotin halide borates having the following general formula:

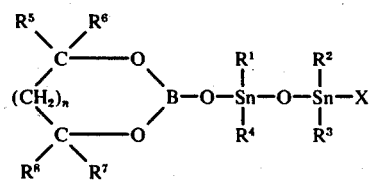

where $R^1$, $R^2$, $R^3$ and $R^4$ are the same or different and are an aryl group, aralkyl group, alkaryl group or $C_1$ to $C_8$ alkyl group, $R^5$ and $R^7$ are hydrogen or $C_1$ to $C_4$ alkyl group, $R^6$ and $R^8$ are $C_1$ to $C_4$ alkyl group, X is hydrogen of atomic weight of 35 to 80 and n is 0, 1 or 2 and (2) an organic thiol compound having a molecular weight of from 40 to 400 per thiol group and a boiling point of at least 180° C at one atmosphere pressure.

2. The stabilizer composition of claim 1, wherein the organic thiol compound is a member selected from organic thiol compounds having the following general formulae:

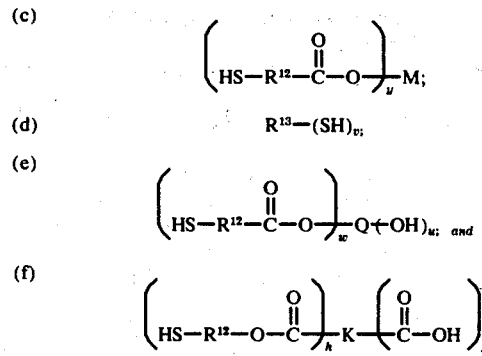

where $R^{12}$ is a $C_1$ to $C_{20}$ linear or branched alkylene radical, $R^{13}$ is an aromatic group or $C_3$ to $C_{36}$ aliphatic group and having a free valence equal to v, M is hydrogen, calcium, barium, tin, cadmium or lead, Q is a saturated or unsaturated aliphatic group, cycloaliphatic group or aromatic group and having a free valence equal to (w + u), K is a saturated or unsaturated aliphatic group, cycloaliphatic group or aromatic group and having a free valence equal to (h + j), y is 1 to 4, v is 1 to 6, w is 1 to 8, u is 0 to 7, h is 1 to 4 and j is 0 to 3 wherein w + u is from 1 to 8 and h to j is from 1 to 4.

3. The stabilizer composition of claim 2, wherein the organotin halide borate has the following general formula:

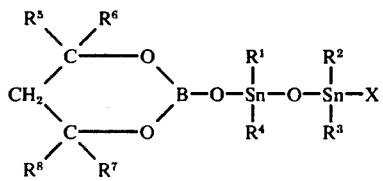

wherein $R^1$, $R^2$, $R^3$ and $R^4$ are the same or different and are aryl group, aralkyl group, alkaryl group or $C_1$ to $C_8$ alkyl group, $R^5$ and $R^7$ are hydrogen or $C_1$ to $C_4$ alkyl group, $R^6$ and $R^8$ are $C_1$ to $C_4$ alkyl group, X is halogen of atomic weight 35 to 80.

4. The stabilizer composition of claim 2, wherein the organotin halide borate has the following general formula:

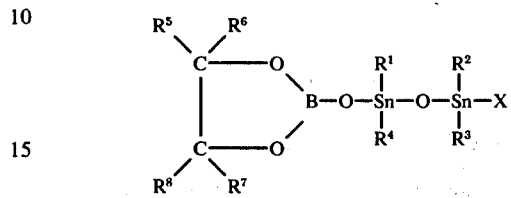

wherein $R^1$, $R^2$, $R^3$ and $R^4$ are the same of different and are an aryl group, aralkyl group, alkaryl group or $C_1$ to $C_8$ alkyl group, $R^5$ and $R^7$ are hydrogen or $C_1$ to $C_4$ alkyl group, $R^6$ and $R^8$ are $C_1$ to $C_4$ alkyl group and X is halogen of atomic weight 35 to 80.

5. The stabilizer composition of claim 2, wherein the organotin halide borate has the following general formula:

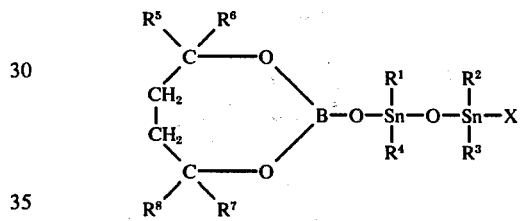

wherein $R^1$, $R^2$, $R^3$ and $R^4$ are the same or different and are an aryl group, aralkyl group, alkaryl group to $C_1$ to $C_8$ alkyl group, $R^5$ and $R^7$ are hydrogen or $C_1$ to $C_4$ alkyl group, $R^6$ and $R^8$ and $C_1$ to $C_4$ alkyl group and X is halogen of atomic weight of 35 to 80.

6. The stabilizer composition of claim 2, wherein the weight ratio or organotin halide borate to organic thiol compound is from 1:4 to 4:1.

7. The stabilizer composition of claim 6, wherein the weight ratio of organotin halide borate to organic thiol compound is from 1:1 to 7:3.

8. The stabilizer composition of claim 3, wherein the organotin halide borate is 1-(4,4,6-trimethyl-1,3,2-dioxaborinyl-2-oxy)-3-chloro-1,1,3,3-tetramethyldistannoxane.

9. The stabilizer composition of claimm 3, wherein the organotin halide borate is 1-(4,4,6-trimethyl-1,3,2-dioxaborinyl-2-oxy)-3-chloro-1,1,3,3-tetrabutyldistannoxane.

10. The stabilizer composition of claim 3, wherein the organotin halide borate is 1-(4,4,6-trimethyl-1,3,2-dioxaborinyl-2-oxy)-3-bromo-1,1,3,3-tetrabutyldistannoxane.

11. A plastic composition having improved resistance to early color formation during processing comprising (1) a vinyl halide homopolymer, vinyl halide copolymer or polymer blend containing a vinyl halide homopolymer or vinyl halide copolymer, (2) an organic thiol compound having a molecular weight per thiol group of from 40 to 400 and a boiling point of at least 180° C at one atmosphere pressure, and (3) an organotin halide borate which is a member selected from organotin halide borates having the following general formula:

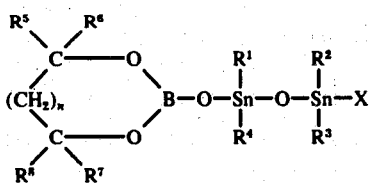

where $R^1$, $R^2$, $R^3$ and $R^4$ are the same or different and are an aryl group, aralkyl group, alkaryl group or $C_1$ to $C_8$ alkyl group, $R^5$ and $R^7$ are hydrogen or $C_1$ to $C_4$ alkyl group, $R^6$ and $R^8$ are $C_1$ to $C_4$ alkyl group, X is halogen of atomic weight of 35 to 80 and n is 0, 1 or 2, said organotin halide borate and said organic thiol compound being present in a stabilizing effective amount.

12. The plastic composition of claim 11, wherein the organic thiol compound is selected from organic thiol compounds having the following general formulae:

(c)  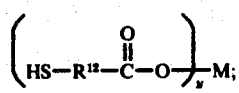

(d)  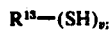

(e)  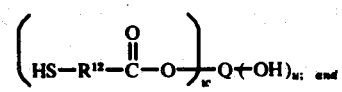

(f)  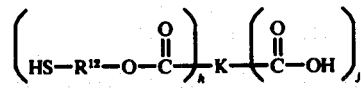

where $R^{12}$ is a $C_1$ to $C_{20}$ linear or branched alkylene radical, $R^{13}$ is an aromatic or $C_3$ to $C_{36}$ aliphatic group and having a free valence equal to v, M is hydrogen, calcium, barium, tin, cadmium or lead, Q is a saturated or unsaturated aliphatic group, cycloaliphatic group or aromatic group and having a free valence equal to $(w + u)$, K is a saturated or unsaturated aliphatic group, cycloaliphatic group, or aromatic group and having a free valence equal to $(h + j)$, y is 1 to 4, v is 1 to 6, w is 1 to 8, u is 0 to 7, h is 1 to 4 and j is 0 to 3 wherein $w + u$ is from 1 to 8 and $h + j$ is from 1 to 4.

13. The plastic compositions of claim 12 wherein the weight ratio of the organotin halide borate to the organic thiol compound is from 1:4 to 4:1.

14. The plastic compositions of claim 12, wherein the combined weight concentration of the organotin halide borate plus the organic thiol compound is from 0.01 to 5 weight percent based on the weight of the vinyl halide homopolymer, vinyl, halide copolymer or polymer blend containing vinyl halide homopolymer or vinyl halide copolymer.

15. The plastic compositions of claim 12, wherein in the organotin halide borate general formula n is zero.

16. The plastic composition of claim 12, wherein in the organotin halide borate general formula n is one.

17. The plastic compositions of claim 12 wherein in the organotin halide borate general n is two.

18. The plastic composition of claim 12 wherein the organotin halide borate is 1-(4,4,6-trimethyl-1,3,2-dioxaborinyl-2-oxy)-3-chloro-1,1,3,3-tetramethyldistannoxane.

19. The plastic compositions of claim 12, wherein the organotin halide borate is 1-(4,4,6-trimethyl-1,3,2-dioxaborinyl-2-dioxaborinyl-2-oxy)-3-chloro-1,1,3,3-tetrabutyldistannoxane.

20. The plastic compositions of claim 12, wherein the organotin halide borate is 1-(4,4,6-trimethyl-1,3,2-dioxaborinyl-2-oxy(-3-bromo-1,1,3,3-tetrabutyldistannoxane.

21. The plastic compositions of claim 11, wherein the vinyl halide homopolymer, vinyl halide copolymer or polymer blend contaning a vinyl halide homopolymer or vinyl halide copolymer is polyvinyl chloride, a vinyl chloride copolymer or a polymer blend containing polyvinyl chloride or a vinyl chloride copolymer.

22. The plastic compositions of claim 13, wherein the weight ratio is from 1:1 to 7:3.

23. The plastic compositions of claim 13, wherein the weight concentration is from 0.5 to 1.0 weight percent.

* * * * *

UNITED STATES PATENT OFFICE
CERTIFICATE OF CORRECTION

PATENT NO. : 4,021,407
DATED : May 3, 1977
INVENTOR(S) : Robert George Gough and Francis Joseph Buescher It is certified that error appears in the above-identified patent and that said Letters Patent are hereby corrected as shown below:

At claim 1 (column 13, lines 19-20): change "hydrogen" to read --halogen--.

At claim 2 (column 13, line 55): change "to" at second occurrence to read --+--.

At claim 5 (column 14, line 39): change "to" to read --or--.

At claim 6 (column 14, line 44): change "or" to read --of--.

At claim 19 (column 16, line 28): delete "-2-dioxaborinyl".

Signed and Sealed this

Twenty-second Day of November 1977

[SEAL]

Attest:

RUTH C. MASON
Attesting Officer

LUTRELLE F. PARKER
Acting Commissioner of Patents and Trademark